(12) United States Patent
Manshadi et al.

(10) Patent No.: US 9,996,530 B1
(45) Date of Patent: Jun. 12, 2018

(54) DETERMINING NCCS AND/OR USING THE NCCS TO ADAPT PERFORMANCE OF COMPUTER-BASED ACTION(S)

(71) Applicant: Google Inc., Mountain View, CA (US)

(72) Inventors: Mohammad Mehdi Hafezi Manshadi, Palo Alto, CA (US); Iftekhar Naim, Sunnyvale, CA (US); Soumen Chakrabarti, Mubai (IN)

(73) Assignee: GOOGLE LLC, Mountain View, CA (US)

( * ) Notice: Subject to any disclaimer, the term of this patent is extended or adjusted under 35 U.S.C. 154(b) by 0 days. days.

(21) Appl. No.: 15/474,956

(22) Filed: Mar. 30, 2017

Related U.S. Application Data

(60) Provisional application No. 62/440,817, filed on Dec. 30, 2016.

(51) Int. Cl.
*G06F 17/27* (2006.01)
*G06N 99/00* (2010.01)

(52) U.S. Cl.
CPC ........ *G06F 17/2785* (2013.01); *G06F 17/274* (2013.01); *G06F 17/277* (2013.01); *G06F 17/2775* (2013.01); *G06N 99/005* (2013.01)

(58) Field of Classification Search
CPC .......................... G06F 17/2775; G06F 17/2785
See application file for complete search history.

(56) References Cited

U.S. PATENT DOCUMENTS 8,108,391 B1 * 1/2012 Yang ................... G06F 17/2775
                                                         707/736
2015/0134324 A1 * 5/2015 Doornenbal .......... G06F 17/241
                                                         704/9

OTHER PUBLICATIONS

Mikolov, Tomas, et al. "Distributed representations of words and phrases and their compositionality." Advances in neural information processing systems. 2013. (Year: 2013).*
Yazdani, Majid, Meghdad Farahmand, and James Henderson. "Learning semantic composition to detect non-compositionality of multiword expressions." Proceedings of the 2015 Conference on Empirical Methods in Natural Language Processing. 2015. (Year: 2015).*
Kiela, Douwe, and Stephen Clark. "Detecting compositionality of multi-word expressions using nearest neighbours in vector space models." Proceedings of the 2013 conference on empirical methods in natural language processing. 2013. (Year: 2013).*
Reddy, Siva, Diana McCarthy, and Suresh Manandhar. "An empirical study on compositionality in compound nouns." Proceedings of 5th International Joint Conference on Natural Language Processing. 2011. (Year: 2011).*

(Continued)

*Primary Examiner* — Brian L Albertalli
(74) *Attorney, Agent, or Firm* — Middleton Reutlinger

(57) ABSTRACT

Systems, methods, and computer readable media related to determining whether a compound is a non-compositional noun compound ("NCC"). Some implementations are additionally or alternatively directed to using determined NCCs to adapt performance of one or more computer-based actions such as indexing or otherwise annotating electronic resources (e.g., web pages or other Internet resources), processing search queries, identifying and/or ranking electronic resources in response to search queries, identifying and/or ranking search query suggestions for search queries, etc.

20 Claims, 6 Drawing Sheets

(56) References Cited

OTHER PUBLICATIONS

Salehi, Bahar, Paul Cook, and Timothy Baldwin. "A word embedding approach to predicting the compositionality of multiword expressions." Proceedings of the 2015 Conference of the North American Chapter of the Association for Computational Linguistics: Human Language Technologies. 2015. (Year: 2015).*

Vecchi, Eva Maria, Marco Baroni, and Roberto Zamparelli. "(Linear) maps of the impossible: capturing semantic anomalies in distributional space." Proceedings of the Workshop on Distributional Semantics and Compositionality. Association for Computational Linguistics, 2011. (Year: 2011).*

Günther, Fritz, and Marco Marelli. "Understanding Karma Police: The Perceived Plausibility of Noun Compounds as Predicted by Distributional Models of Semantic Representation." PloS one 11.10 (2016): e0163200. (Year: 2016).*

Farahmand, Meghdad, and James Henderson. "Modeling the non-substitutability of multiword expressions with distributional semantics and a log-linear model." Proceedings of the 12th Workshop on Multiword Expressions. 2016. (Year: 2016).*

Dima, Corina; Reverse-engineering language: A study on the semantic compositionality of German compounds. In EMNLP, pp. 1637-1642; DE; dated 2015.

Farahmand, Meghdad et al.; Modeling the Statistical Idiosyncrasy of Multiword Expressions. In MWE Workshop, NAACL-HLT, pp. 34-38; dated 2015.

Farahmand, Meghdad et al.; A Multiword Expression Data Set: Annotating Non-compositionality and Conventionalization for English Noun Compounds; In NAACL-HLT, pp. 29-33; dated 2015.

Yazdani, Majid et al.; Learning Semantic Composition to Detect Non-compositionality of Multiword Expressions; In EMNLP, pp. 1733-1742; dated 2015.

* cited by examiner

DETERMINING NCCS AND/OR USING THE NCCS TO ADAPT PERFORMANCE OF COMPUTER-BASED ACTION(S)

BACKGROUND

A noun compound (also referred to herein as a "compound") is a noun that is made up of two or more words. For example, "crime scene", "tape recorder", "quarter finals", and "swimming pool" are all noun compounds. A non-compositional noun compound (also referred to herein as an "NCC") is a compound whose meaning cannot be transparently inferred from the meanings of its constituent words. An NCC may also be referred to as a multiword expression. Some examples of NCCs include "bull market", "soap opera", "chain smoker", and "leap year." For instance, "soap opera" is non-compositional because its meaning cannot be transparently inferred from the meanings of "soap" and "opera" (i.e., it is not an opera about soap but, rather, a genre of TV shows). On the other hand, "swimming pool" is compositional because its meaning can be transparently inferred from the meanings of "swimming" and "pool" (i.e., it is a pool for swimming).

SUMMARY

Implementations of this specification are directed generally to systems, methods, and computer readable media related to determining whether a compound is an NCC. Some implementations are additionally or alternatively directed to using determined NCCs to adapt performance of one or more computer-based actions such as indexing or otherwise annotating electronic resources (e.g., web pages or other Internet resources), processing search queries, identifying and/or ranking electronic resources in response to search queries, identifying and/or ranking search query suggestions for search queries, etc.

In some implementations of determining whether a compound is an NCC, an extended substitution analysis is performed on the compound to generate an extended substitution score for the compound that indicates whether the compound is an NCC. In some of those implementations, a distributional anomaly analysis is also performed on the compound to generate a distributional anomaly score for the compound that also indicates whether the compound is an NCC. In some versions of those implementations, both the extended substitution score and the distributional anomaly score for the compound are utilized in determining whether the compound is an NCC.

The extended substitution analysis is described in more detail herein and may include performing, for each of a plurality of candidate substitutions for a word of the compound: a lexical network analysis, a corpus of text analysis, and/or a distributional embedding analysis. A score may optionally be generated for each of the candidate substitutions and the individual scores utilized in generating the extended substitution score. As described in more detail herein, the extended substitution score may be utilized to determine that compounds such as "long dress" are not NCCs because many plausible substitutions can be identified for "long dress" such as "tall dress", "short dress", etc. On the other hand, the extended substitution score may be utilized to determine that compounds such as "soap opera" are NCCs because substitutions such as "shampoo opera", "detergent opera", etc. are not plausible (e.g., rarely, if ever, occur in a corpus of text). In various implementations, the candidate substitutions may be selected to include words that extend beyond synonyms of the word that is being substituted.

The distributional anomaly analysis is also described in more detail herein and may include generating an embedding vector for each of the words of the compound, generating an estimated embedding vector for the compound based on the embedding vectors for each of the words, generating an observed embedding vector for the compound, and generating the distributional anomaly score based on comparing the estimated and observed embedding vectors for the compound. In some implementations, generating the estimated embedding vector may be based on applying the embedding vectors for each of the words to a trained neural network model and generating, over the model, the estimated embedding vector for the noun compound.

In some further implementations, the extended substitution analysis and/or the distributional anomaly analysis may be performed on a large group of compounds to determine a subgroup of those compounds that are likely an NCC based on the analysis. Further, compounds of the subgroup may be provided to computing devices of one or more human reviewers and the human reviewers may label those compounds using user interface input devices of the computing devices. Each of the labels may indicate whether the corresponding compound is an NCC. The labels may be utilized to generate training examples, that each include training example input of: a corresponding compound and/or feature(s) of the compound; and training example output that is based on label(s) for the corresponding compound and that indicates whether the corresponding compound is an NCC. The training examples may be utilized to train a neural network model to enable prediction, over the model, of whether a compound is an NCC. These further implementations bring human feedback into the loop to generate training examples and utilize the training examples to further improve accuracy of the neural network model.

Implementations disclosed herein may achieve various technical advantages. For example, some implementations may achieve more accurate and/or more robust NCC detection than prior techniques. Some of those implementations may conserve storage space and/or other computational resources that may otherwise be consumed as a result of inaccurate detection of noun compounds as NCCs. Additionally or alternatively, the more accurate and/or more robust NCC detection of some of those implementations may result in improved performance of one or more computer-based actions such as indexing or otherwise annotating electronic resources, processing search queries, identifying and/or ranking electronic resources in response to search queries, identifying and/or ranking search query suggestions for search queries, etc. As yet another example, implementations that utilize a trained neural network model that directly determines whether a compound is an NCC may be more computationally efficient when used to determine whether the compound is an NCC (i.e., after training) as compared to prior techniques. Additional and/or alternative technical advantages may be provided, such as those described elsewhere herein.

In some implementations, a method performed by one or more processors is provided that includes identifying, from one or more computer readable media, a compound that comprises at least a first word and a second word. The method further includes, for each of a plurality of candidate substitutions for the first word: determining a plurality of measures that each indicate plausibility of substitution of the candidate substitution for the first word, and generating a score for the candidate substitution based on the plurality of measures. The method further includes generating an extended substitution score for the compound based on the scores for the candidate substitutions; and generating a distributional anomaly score for the compound. Generating the distributional anomaly score includes: generating an estimated embedding vector for the compound based on a generated first word embedding vector of the first word and a generated second word embedding vector of the second word; generating an observed embedding vector for the compound based on application of the compound to a trained embedding model; and generating the distributional anomaly score based on comparison of the estimated embedding vector and the observed embedding vector. The method further includes: generating a non-compositional noun compound (NCC) score for the compound based on both the extended substitution score and the distributional anomaly score; and storing, in one or more of the computer readable media, an assignment of the NCC score to the compound; and/or a label generated based on the NCC score to the compound. In some implementations, the method further includes, subsequent to the storing: receiving a search query that includes the compound and that is submitted via a client computing device; determining the compound is an NCC based on the stored NCC score or the stored label; in response to determining the compound is an NCC, treating the compound as a cohesive unit in identifying content that is responsive to the search query; and in response to the search query, providing the content for presentation via the client computing device.

These and other implementations of technology disclosed herein may optionally include one or more of the following features.

In some implementations, determining the plurality of measures includes determining a lexical similarity measure, determining a corpus of occurrence measure, and/or determining a distributional embedding measure. In some of those implementations, determining the lexical similarity measure of the measures is based on determining a lexical similarity between the candidate substitution and the first word in one or more lexical databases. In some of those implementations, determining the corpus occurrence measure of the measures is based on comparison of: a first indicated quantity of occurrences of the compound in a corpus, and a second indicated quantity of occurrences of an alternate compound in the corpus. The alternate compound is the candidate substitution with the second word. In some of those implementations, determining the distributional embedding measure of the measures is based on comparison of the generated first word embedding vector to a generated candidate substitution embedding vector for the candidate substitution. In some versions of those implementations, generating the first word embedding vector is based on application of the first word to the trained embedding model, and generating the candidate substitution embedding vector is based on application of the candidate substitution to the trained embedding model. For example, the trained embedding model may be a trained neural network model and generating the first word embedding vector may include: applying the first word as input to the trained neural network model; and generating, over the trained neural network based on the input, the first word embedding vector. In some other implementations, determining the distributional embedding measure of the measures is based on comparison of: the observed embedding vector for the compound; and a generated alternate compound embedding vector of the alternate compound. The alternate compound may be the candidate substitution with the second word.

In some implementations, generating the NCC score for the compound includes weighting the extended substitution score more heavily than the distributional anomaly score in generating the NCC score.

In some implementations, the storing includes storing the assignment of the label to the NCC score based on the NCC score satisfying a threshold. In some of those implementations, the label indicates the compound is an NCC.

In some implementations, treating the compound as the cohesive unit in identifying content that is responsive to the search query includes: determining one or more search results to include in the content based on search result documents, that correspond to the search results, being indexed by the compound as the cohesive unit.

In some implementations, treating the compound as the cohesive unit in identifying content that is responsive to the search query includes: determining one or more search query suggestions to include in the content based on the search query suggestions including the compound as the cohesive unit.

In some implementations, a method performed by one or more processors is provided that includes identifying, from one or more computer readable media, a compound that comprises at least a first word and a second word. The method further includes, for each of a plurality of candidate substitutions for the first word: determining a plurality of measures that each indicate plausibility of substitution of the candidate substitution for the first word, and generating a score for the candidate substitution based on the plurality of measures. The method further includes generating an extended substitution score for the compound based on the scores for the candidate substitutions, and generating a distributional anomaly score for the compound. Generating the distributional anomaly score includes: generating an estimated embedding vector for the compound based on a generated first word embedding vector of the first word and a generated second word embedding vector of the second word, generating an observed embedding vector for the compound based on application of the compound to a trained embedding model, and generating the distributional anomaly score based on comparison of the estimated embedding vector and the observed embedding vector. The method further includes: generating a non-compositional noun compound (NCC) score for the compound based on both the extended substitution score and the distributional anomaly score; determining that the NCC score satisfies a threshold; and in response to determining that the NCC score satisfies the threshold, assigning, to the compound in one or more of the computer readable media, a label that indicates the compound is an NCC.

These and other implementations of technology disclosed herein may optionally include one or more of the following features.

In some implementations, determining the plurality of measures determining a lexical similarity measure of the measures, generating a corpus of occurrence measure of the measures, and/or determining a distributional embedding measure of the measures. Determining the lexical similarity measure may be based on determining a lexical similarity between the candidate substitution and the first word in one or more lexical databases. Generating the corpus occurrence measure may be based on comparison of: a first indicated quantity of occurrences of the compound in a corpus, and a second indicated quantity of occurrences of an alternate compound in the corpus. The alternate compound may be the candidate substitution with the second word. Determining the distributional embedding measure may be based on comparison of the generated first word embedding vector to a generated candidate substitution embedding vector for the generate candidate substitution. Generating the first word embedding vector may be based on application of the first word to the trained embedding model, and generating the candidate substitution embedding vector may be based on application of the candidate substitution to the trained embedding model.

In some implementations, generating the NCC score for the compound includes weighting the extended substitution score more heavily than the distributional anomaly score in generating the NCC score.

In some implementations, the storing includes storing the assignment of the label to the NCC score based on the NCC score satisfying a threshold, and the label indicates the compound is an NCC.

In some implementations, a method performed by one or more processors is provided that includes identifying, from one or more computer readable media, a group of compounds that each comprise at least a first word and a second word. The method further includes, for each of the compounds of the group: generating an extended substitution score for the compound based on individual scores for a plurality of candidate substitutions of the first word of the compounds. The method further includes selecting a subgroup of the compounds based on the extended substitution scores for the compounds; transmitting the compounds of the subgroup to client computing devices; and receiving, in response to the transmitting, labels for the compounds. The labels are generated based on user interface input generated via the computing devices. The method further includes generating training examples based on the compounds of the subgroup and the labels. Each of the training examples include: training example input based on a corresponding one of the compounds, and training example output based on one or more of the labels for the corresponding one of the compounds. In some implementations, the method further includes training a neural network model based on the training examples.

These and other implementations of technology disclosed herein may optionally include one or more of the following features.

In some implementations, the method further includes performing the following steps subsequent to the training: applying, as input to the neural network model, a new compound; generating, over the neural network model based on the input, output that indicates whether the new compound is an NCC; and assigning, to the new compound in one or more of the computer readable media, the output or a label that is based on the output.

Other implementations may include a non-transitory computer readable storage medium storing instructions executable by a processor (e.g., a central processing unit (CPU), graphics processing unit (GPU), and/or Tensor Processing Unit (TPU)) to perform a method such as one or more of the methods described above. Yet another implementation may include a system of one or more computers that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
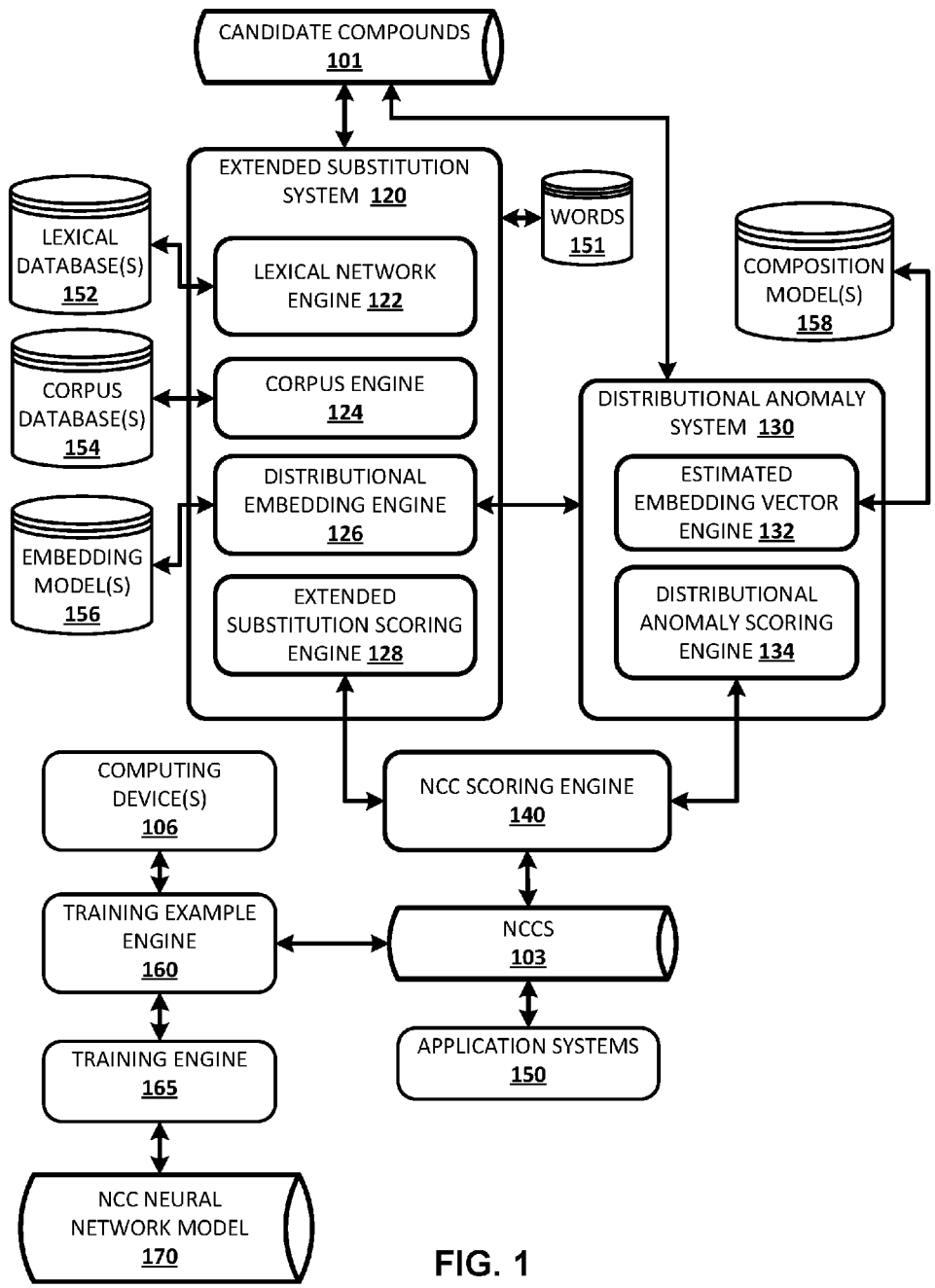
FIG. 1 is a block diagram of an example environment in which implementations disclosed herein may be implemented.

FIG. 1 illustrates a block diagram of an example environment in which implementations disclosed herein may be implemented. The example environment includes a plurality of candidate compounds 101 that may be stored in one or more computer-readable media. Each of the candidate compounds 101 may be a noun that is made up of two or more words and the candidate compounds 101 may be collected by one or more computer systems from a variety of electronic resources such as web pages, submitted search queries, blog postings, etc.

For a given compound of the candidate compounds 101, the extended substitution system 120 may generate an extended substitution score for the given compound that indicates whether the given compound is an NCC. The distributional anomaly system 130 may also generate a distributional anomaly score for the given compound that separately indicates whether the given compound is an NCC.

The extended substitution score and the distributional anomaly score may be provided to the NCC scoring engine 140, which may use both the extended substitution score and the distributional anomaly score to generate an NCC score for the given compound. If the NCC score for the given compound satisfies a threshold, the NCC scoring engine 140 may indicate the given compound as belonging to a group of NCCs 103. In some of those implementations, the NCC scoring engine 140 may indicate the given compound as belonging to the group of NCCs by assigning the score to the given compound (e.g., in one or more computer readable media) and/or by assigning an "NCC label" to the given compound (e.g., in one or more computer readable media).

In some implementations, one or more application systems 150 may utilize the group of NCCs 103 to adapt performance of one or more computer-based actions performed by the application system(s) 150. For example, the application system(s) 150 may include a search engine and the search engine may receive a search query that includes a compound. The search engine may determine the compound belongs to the group of NCCs 103 and, as a result, may treat the compound as a cohesive unit in performing one or more further computer-based actions. For example, the search engine may treat the compound as a cohesive unit in identifying and/or ranking one or more web pages and/or other electronic resources that are responsive to the search query. For instance, the search engine may identify resources that are indexed by the compound as a cohesive unit (and optionally not identify one or more resources that are indexed by only a subgroup of the words of the compound). As another example, the search engine may treat the compound as a cohesive unit in identifying one or more search query suggestions to provide as "suggested searches" as alternatives to the search query. For instance, the search engine may identify search query suggestions that include the compound as a cohesive unit (and optionally not identify one or more search query suggestions that include only a subgroup of the words of the compound).

In some implementations, the group of NCCs 103 may additionally and/or alternatively be provided to a training example engine 160. The training example engine 160 may provide one or more (e.g., all) of the NCCs of the group of NCCs 103 to computing devices 106 of one or more human reviewers, and the human reviewers may label those noun compounds using user interface input devices of the computing devices 106. Each of the labels may indicate whether the corresponding compound is an NCC. The training example engine 160 may utilize the labels to generate training examples, that each include training example input of: a corresponding compound and/or feature(s) of the compound; and training example output that is based on label(s) for the corresponding compound and that indicates whether the corresponding compound is an NCC. The training engine 165 may further use the training examples to train an NCC neural network model 170 to enable prediction, over the NCC neural network model 170, of whether a compound is an NCC. These implementations bring human feedback into the loop to generate training examples and utilize the training examples to further improve accuracy of the neural network model 170.

The extended substitution system 120 may include a lexical network engine 122, a corpus engine 124, a distributional embedding engine 126, and an extended substitution scoring engine 128. In some implementations, one or more of the engines of extended substitution system 120 may be omitted, combined, and/or implemented in a component that is separate from the extended substitution system 120.

Further description of the extended substitution system 120 is now provided with respect to a single compound, which may be one of the compounds of candidate compounds 101. Although description of the extended substitution system 120 is provided with respect to a single compound, it is understood that the extended substitution system 120 may be utilized to generate an extended substitution score for each of a plurality of compounds of candidate compounds 101.

For the compound, the extended substitution system 120 identifies, from words database 151, a plurality of candidate substitutions for one of the words for the compound. The words database 151 may include, for example, a vocabulary of words such as all words in a lexicon. As one example, for the compound "soap opera", the extended substitution system 120 may identify a plurality of candidate substitutions for the word "soap". Each candidate substitution is a word (or multiple words).

As described in more detail below, the extended substitution system 120 analyzes each of the candidate substitutions to generate a candidate substitution score for the candidate substitution and generates an extended substitution score for the compound based on the plurality of generated candidate substitution scores. Each candidate substitution score indicates the plausibility of substituting the word with the corresponding candidate substitution. Generally speaking, where there are a significant quantity of candidate substitution scores that indicate a plausible substitution, the extended substitution score will not be indicative of the compound being an NCC (i.e., it will instead be indicative of the compound being compositional). On the other hand, where there are relatively few (or none) candidate substitution scores that indicate a plausible substitution, the extended substitution score will be indicative of the compound being an NCC.

In some implementations, the extended substitution system 120 identifies candidate substitutions that extend beyond just synonyms of the word that is being substituted. For example, the extended substitution system 120 may identify, from words database 151, candidate substitutions for a given word that include: synonyms of the given word, word(s) that are not synonyms but that are connected to the given word in WordNet and/or other database, and/or word(s) that are "nearby" (e.g., satisfy a distance threshold) to the given word in an embedding space. As another example, the extended substitution system 120 may identify, as candidate substitutions for a given word, all (or a significant portion) of the words of words database 151 that are different from the given word.

For each identified candidate substitution, the lexical network engine 122 may generate lexical similarity measure(s), the corpus engine 124 may generate corpus measure(s), and the distributional embedding engine 126 may generate distributional embedding measure(s). Further, the extended substitution scoring engine 128 may utilize the generated measures to generate and store a candidate substitution score for the candidate substitution. The extended substitution scoring engine 128 may further utilize the candidate substitution scores for the candidate substitutions to generate and store an extended substitution score for the compound.

The lexical network engine 122 is in communication with one or more lexical databases 152. In generating a lexical similarity measure for a candidate substitution of a given word of a compound, the lexical network engine 122 may generate the lexical similarity measure based on one or more measures of similarity between the candidate substitution and the given word in the lexical database(s) 152. For example, the lexical database(s) 152 may define, for each of a plurality of words, one or more properties of the word (e.g., a lexical category, a definition for each sense of the word) and/or one or more relationships between the word and related words (e.g., relationships between the word and other words that are synonyms of the word, semantically similar to the word, and/or phonologically similar to the word). As one example, the lexical network engine 122 may generate a lexical similarity measure for the candidate substitution of a given word based on relationship(s) between the candidate substitution and the word in the lexical database(s) 152 and/or based on comparison of the properties of the word to the properties of the candidate substitution in the lexical database(s) 152. For instance, the lexical database(s) 152 may include a WordNet database and the lexical network engine 122 may generate the lexical similarity measure based on a WordNet similarity measure between the word and the candidate substitution (e.g., based on the graph structure and/or other properties of WordNet).

The corpus engine 124 is in communication with one or more corpus databases 154. The corpus database(s) 154 may store measures associated with quantities of occurrence of words and/or compounds across documents or other electronic resources of a corpus of electronic resources. For example, the corpus database(s) 154 may include, for each of a plurality of words and compounds, a raw count of the word or compound across electronic resources of the corpus, a frequency measure of the word or compound across electronic resources of the corpus, and/or other measure(s) that indicate the quantity of occurrence of the word or compound across electronic resources of the corpus.

In generating a corpus measure for a candidate substitution of a given word of a compound, the corpus engine 124 may generate the corpus measure based on: a measure of occurrence of an alternate compound that is the same as the compound but that replaces the given word with the candidate substitution; a pointwise mutual information (PMI) measure between the candidate substitution and the non-substituted word(s) of the compound; and/or a PMI measure between the given word and the non-substituted word(s) of the compound. Variations such as positive PMI (PPMI) and/or normalized PMI (NPMI) are also contemplated. As a working example, assume a candidate substitution of "shampoo" for the word "soap" of the compound "soap opera". The corpus engine 124 may determine a measure of occurrence of an alternate compound "shampoo opera" that is the same as the compound "soap opera", but that replaces "soap" with "shampoo". The corpus engine 124 may additionally or alternatively determine the PMI between "shampoo" and "opera" and/or the PMI between "soap" and "opera". In some of those implementations, the corpus engine 124 may further determine a measure based on the comparison of the PMI between "shampoo" and "opera" to the PMI between "soap" and "opera" (which may judge how significant the alternate compound with the candidate substitution is relative to the original compound).

The distributional embedding engine 126 is in communication with one or more embedding models 156. The distributional embedding engine 126 applies words and/or compounds to the embedding model(s) 156 and generates, over the embedding model(s), embedding vectors for the words and/or compounds. In some implementations, the embedding model(s) 156 may include a neural network model trained to predict an embedding vector based on applied input of a word and/or compound.

In generating a distributional embedding measure for a candidate substitution of a given word of a compound, the distributional embedding engine 126 may generate the distributional embedding measure based on: a measure of similarity between the embedding vector of the candidate substitution and the embedding vector of the given word; and/or a measure of similarity between the embedding vector for the compound and the embedding vector for the alternate compound that is the same as the compound but replaces the given word with the candidate substitution.

As a working example, assume a candidate substitution of "shampoo" for the word "soap" of the compound "soap opera". The distributional embedding engine 126 may determine a measure of similarity between the embedding vector for "soap" and the embedding vector for "shampoo". For instance, the engine 126 may determine the cosine similarity between the two embedding vectors. The distributional embedding engine 126 may additionally or alternatively determine a measure of similarity between the embedding vector for "soap opera" and the embedding vector for "shampoo opera". For instance, the engine 126 may determine the cosine similarity between the two embedding vectors, which may measure the perturbation to the compound embedding as a result of the substitution. In some implementations, the embedding model(s) 156 may include word2vec and/or GloVE embedding models.

For each candidate substitution for a compound, the extended substitution scoring engine 128 utilizes the measures generated by each of the engines 122, 124, and 126 for the candidate substitution, to generate a candidate substitution score for the candidate substitution. Further, the extended substitution scoring engine 128 utilizes the candidate substitution scores to generate an extended substitution score for the compound. The engine 128 provides the extended substitution score for the compound to the NCC scoring engine 140. As described in more detail below, the NCC scoring engine 140 generates an NCC score for the compound based on both the extended substitution score for the compound and a distributional anomaly score for the compound that is generated by the distributional anomaly system 130.

In some implementations, the extended substitution scoring engine 128 generates the candidate substitution score for a candidate substitution by applying a vector of the various measures, generated by the engines 122, 124, and 126, to a model weight vector. For example, the engine 128 may generate the candidate substitution score based on calculating the dot product of the vector of the various measures and the model weight vector. The engine 128 may further map the calculated dot product to a value in a range (e.g., a range from 0 to 1) using a sigmoid function and/or other function(s).

In some implementations, the engine 128 may not generate a candidate substitution score for one or more of the candidate substitutions based on one or more of the measures generated by one or more of the engines 122, 124, and/or 126 failing to satisfy a threshold. For example, the engine 128 may optionally ignore a candidate substitution if the corpus engine 124 determines that one or more measures of occurrence fail to satisfy a threshold, such as a measure of occurrences of an alternate compound that is the same as the compound but replaces the given word with the candidate substitution.

In some implementations, the extended substitution scoring engine 128 generates the extended substitution score for the compound based on adding the candidate substitution scores. This may serve as a "soft count" of plausible substitutions. The engine 128 may further map the sum to a value in a range (e.g., a range from 0 to 1) using a sigmoid function. The engine 128 may utilize the value subtracted from the upper extent of the range (e.g., 1—value) as the extended substitution score. The extended substitution score provides an indication of whether the compound is an NCC.

Description has been provided of a particular example of the extended substitution system 120 and example databases 152, 154 and model(s) 156 with which it may interact. However, many variations are possible. For example, one or more of the databases and/or models may be combined, omitted, and/or may not be directly accessible to the extended substitution system 120 (e.g., the system 120 may obtain measure(s) indirectly from one or more of the models via an API). Also, for example, other measures for a candidate substitution may be generated that are in addition to and/or instead of one or more of those described above. As another example, other scoring techniques may be utilized by the extended substitution scoring engine 128 such as other forms of nonlinear and/or linear scoring. As yet another example, and as described with respect to FIG. 4 and elsewhere herein, in some implementations a trained neural network model may be utilized in lieu of extended substitution system 120 and its associated databases and model(s).

The distributional anomaly system 130 may include an estimated embedding vector engine 132 and a distributional anomaly scoring engine 134. In some implementations, one or more of the engines of distributional anomaly system 130 may be omitted, combined, and/or implemented in a component that is separate from distributional anomaly system 130. For example, in some implementations distributional anomaly system 130 and extended substitution system 120 may be combined into a single system.

For a compound, the distributional anomaly system 130 receives, from the distributional embedding engine 126, an embedding vector for the compound, and embedding vectors for each of the words of the compound. The received embedding vector for the compound is an observed embedding vector in that it is the embedding vector determined based on application of the compound to the embedding model(s) 156. The embedding vectors for each of the words of the compound are also observed embedding vectors in that each is determined based on application of the corresponding word to the embedding model(s) 156.

The estimated embedding vector engine 132 generates an estimated embedding vector for the compound based on application of the embedding vectors for each of the words of the compound to one or more composition models 158. The composition model(s) 158 are used to attempt to compose embedding vectors for words of a compound into a putative/estimated embedding vector for the compound. For example, the composition model(s) 158 can be utilized to attempt to compose a first embedding vector for "soap" and a second embedding vector for "opera" into a putative embedding for "soap opera". Various composition model(s) 158 may be utilized, such as those that generate the estimated embedding vector by effectively performing an explicit feature cross between the first embedding vector and the second embedding vector.

The distributional anomaly scoring engine 134 generates a distributional anomaly score based on comparing the estimated embedding vector for the compound (generated by engine 132) to the observed embedding vector for the compound (provided by engine 126). For example, the engine 134 may generate one or more measures of divergence between the estimated and observed embedding vectors, and generate the distributional anomaly score based on the measure(s) of divergence. Various measures of divergence can be generated, such as the so-called "L2 distance". Generally, the larger the measure of divergence is, the more likely it is that the compound is an NCC. For example, the measure of divergence for "soap opera" will be relatively large since the estimated embedding vector inferred from the individual embedding vectors for "soap" and "opera" will be a relatively large distance from the observed embedding vector for "soap opera" (i.e., since the meaning of "soap opera" is not directly inferable from the meanings of "soap" and "opera").

The engine 134 can convert the measure(s) of divergence to a value in a range (e.g., using a sigmoid, tan h, and/or other squashing function) and may use the converted value as the distributional anomaly score. The range may be the same and/or similar to the range utilized for the extended substitution score (e.g., a range from 0 to 1). The distributional anomaly score is provided to the NCC scoring engine 140 and, as described below, may be combined with the extended substitution sore in generating an NCC score for the compound.

The NCC scoring engine 140 utilizes the extended substitution score provided by system 120 and the distributional anomaly score provided by the system 130 to generate an NCC score for the given compound. For example, the NCC scoring engine 140 may calculate the NCC score based on (e*distributional anomaly score)+((e−1)*extended substitution score), where e is a blending hyperparameter (e.g., a value between 0 and 1). Other linear and/or non-linear combinations of the extended substitution score and distributional anomaly score may be utilized. If the NCC score for the given compound satisfies a threshold, the NCC scoring engine 140 may indicate the given compound as belonging to a group of NCCs 103. In some of those implementations, the NCC scoring engine 140 may indicate the given compound as belonging to the group of NCCs by assigning the score to the given compound (e.g., in one or more computer readable media) and/or by assigning an "NCC label" to the given compound (e.g., in one or more computer readable media).

Figure 2A:
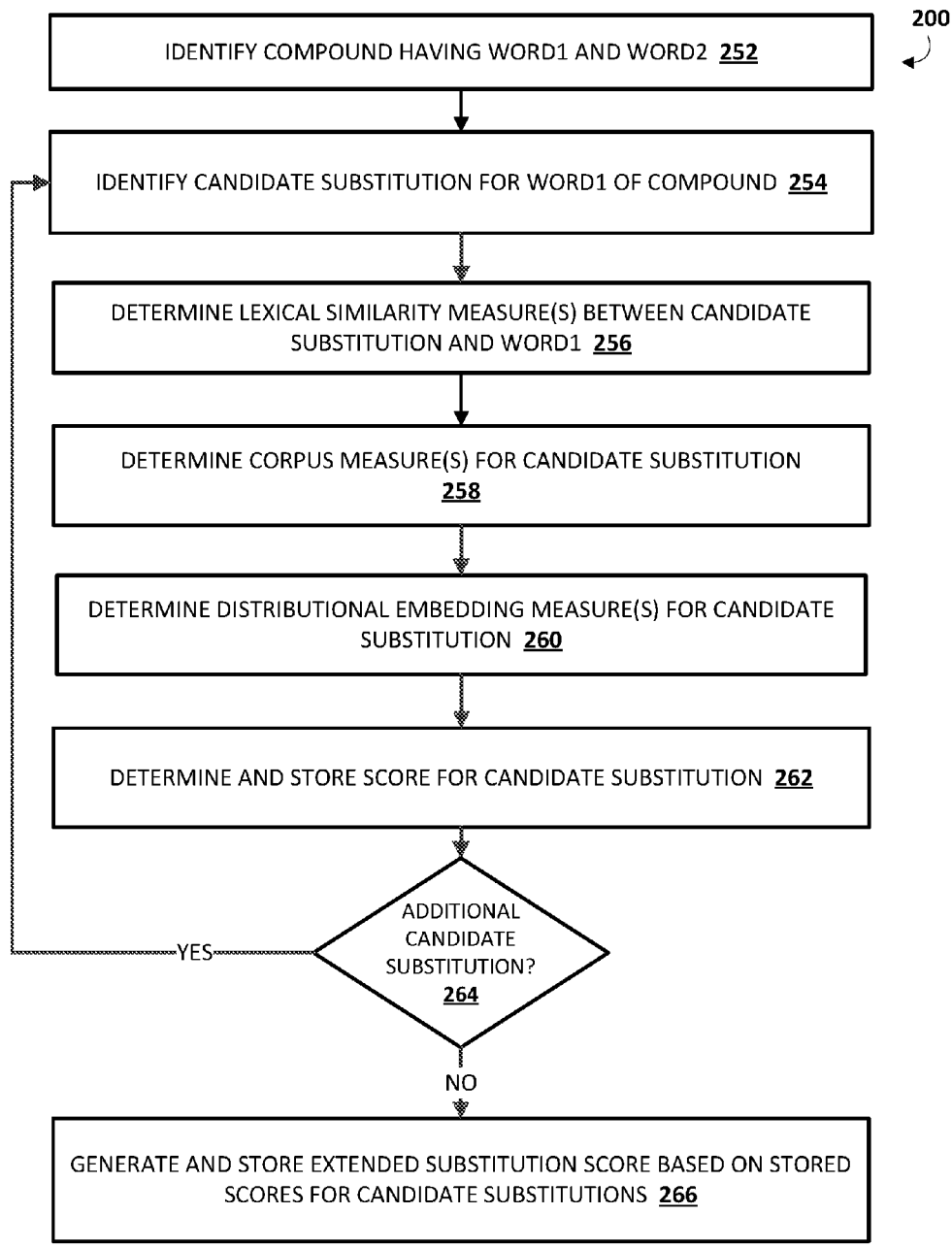
FIGS. 2A and 2B are a flowchart illustrating an example method of determining whether a compound is an NCC.
Figure 2B:
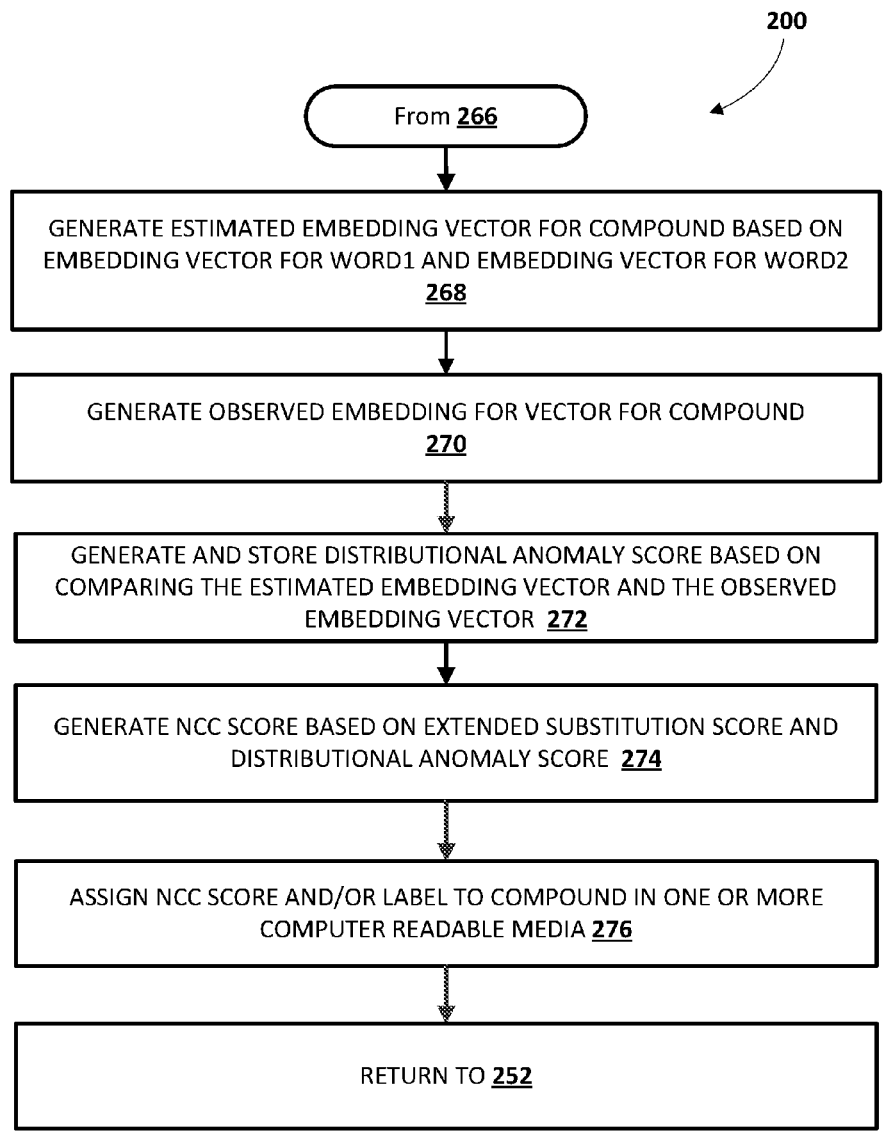

With reference to FIGS. 2A and 2B, a flowchart is provided that illustrates an example method 200 of determining whether a compound is an NCC. For convenience, the operations of the flow chart are described with reference to a system that performs the operations. This system may include one or more components, such as one or more processor (e.g., CPU, GPU, and/or TPU) of extended substitution system 120, distributional anomaly system 130, and/or NCC scoring engine 140. For example, extended substitution system 120 may perform the blocks of FIG. 2A, the distributional anomaly system 130 may perform blocks 268, 270, and 272 of FIG. 2B, and the NCC scoring engine 140 may perform blocks 274 and 276 of FIG. 2B. While operations of method 200 are shown in a particular order, this is not meant to be limiting. One or more operations may be reordered, omitted or added.

At block 252, the system identifies a compound having Word1 and Word2. As a working example for description of method 200, the system may identify the compound "tape recorder" that has Word1 of "tape" and Word2 of "recorder".

At block 254, the system identifies a candidate substitution for Word1 of the compound. For example, the system may identify a candidate substitution of "cassette" for the word "tape".

At block 256, the system determines one or more lexical similarity measures between the candidate substitution and Word1 of the compound. For example, the system may determine one or more lexical similarity measures between the word "cassette" and the word "tape". For instance, the system may determine a WordNet similarity measure between "cassette" and "tape".

At block 258, the system determines one or more corpus measures for the candidate substitution. For example, the system may determine one or more corpus measures based on the candidate substitution of "cassette", which is a candidate substitution for "tape" in the compound "tape recorder". For instance, the system may determine: a measure of occurrence of the alternate compound "cassette recorder"; a PMI measure between "cassette" and "recorder"; a PMI measure between "tape" and "recorder"; and/or a measure based on comparison of the PMI measure between "cassette" and "recorder" and the PMI measure between "tape" and "recorder".

At block 260, the system determines one or more distributional embedding measures for the candidate substitution. For example, the system may determine a measure of similarity between the embedding vector for "tape" and the embedding vector for "cassette" and/or may determine a measure of similarity between the embedding vector for "tape recorder" and the embedding vector for "cassette recorder".

At block 262, the system determines and stores a score for the candidate substitution. For example, the system may determine the score for the candidate substitution based on: calculating a dot product of a model weight vector and a vector of the measures generated at blocks 256, 258, and 260; and mapping the calculated dot product to a value in a range using a sigmoid function and/or other function.

At block 264, the system determines whether there is an additional candidate substitution for Word1 of the compound. If so, the system returns to block 254 and identifies the additional candidate substitution, performs additional iterations of blocks 256, 258, and 260 to determine additional measures for the additional candidate substitution, then determines and stores a score for the additional candidate substitution at block 262. In many implementations, the system may perform many iterations of blocks 256, 258, 260, and 262, each time for a different candidate substitution of Word1. For example, the system may perform an additional iteration of those blocks using the candidate substitution "microcassette", perform an additional iteration of those blocks using the candidate substitution "strip", perform an additional iteration of those blocks using the candidate substitution "band", etc. As described herein, in many implementations the candidate substitutions of one or more iterations may extend beyond just synonyms of "tape". Additional iterations may be performed serially and/or in parallel.

If, at block 264, the system determines there are not additional candidate substitutions for Word1 of the compound, the system proceeds to block 266.

At block 266, the system generates and stores an extended substitution score based on the scores for the candidate substitutions stored at multiple iterations of block 262. For example, the system may generate the extended substitution score for the compound based on adding the candidate substitution scores stored at multiple iterations of block 262. This may serve as a "soft count" of plausible substitutions. The system may further map the sum to a value in a range (e.g., a range from 0 to 1) using a sigmoid and/or other function. The system may utilize the value subtracted from the upper extent of the range (e.g., 1—value) as the extended substitution score.

At block 268, the system generates an estimated embedding vector for the compound of block 252. The system generates the estimated embedding vector based on an embedding vector for Word1 and an embedding vector for Word2. In some implementations, the system utilizes the embedding vector for Word1 and the embedding vector for Word2 optionally generated in block 260. The system may generate the estimated embedding vector for the compound based on application of the embedding vectors for Word1 and Word2 to one or more composition models. For example, the system may utilize a composition model to attempt to compose a first embedding vector for "tape" and a second embedding vector for "recorder" into a putative embedding for "tape recorder".

At block 270, the system generates an observed embedding vector for the compound of block 252. For example, the system may generate the observed embedding vector for "tape recorder" based on application of "tape recorder" to one or more embedding models. In some implementations, the system may utilize an observed embedding vector for "tape recorder" generated in block 260.

At block 272, the system generates and stores a distributional anomaly score based on comparing the estimated embedding vector of block 268 and the observed embedding vector of block 270. For example, the system may generate one or more measures of divergence between the estimated and observed embedding vectors, and generate the distributional anomaly score based on the measure(s) of divergence. Various measures of divergence can be generated, such as the so-called "L2 distance". Generally, the larger the measure of divergence is, the more likely it is that the compound is an NCC. The system can generate the distributional anomaly score based on converting the measure(s) of divergence to a value in a range, such as the same range utilized for the extended substitution score. Although blocks 268, 270, and 272 are illustrated in FIGS. 2A and 2B as occurring after earlier blocks of the method 200, in some implementations one or more of those blocks may be performed before one or more earlier blocks and/or in parallel with one or more earlier blocks.

At block 274, the system generates an NCC score for the compound based on the extended substitution score of block 266 and based on the distributional anomaly score of block 272. For example, the system may generate the NCC score based on (e*distributional anomaly score)+((1−θ)*extended substitution score), where e is a blending hyperparameter. Other linear and/or non-linear combinations of the extended substitution score and distributional anomaly score may be utilized.

At block 276, the system assigns the NCC score and/or a label to the compound in one or more computer readable media. For example, the system may assign the NCC score to the compound and/or may assign a label to the compound based on the NCC score. For instance, the system may assign an "NCC" label to the compound if the score satisfies a threshold and/or may assign a "compositional" label to the compound if the score fails to satisfy the threshold.

Following block 276, the system may then return to block 252, identify an additional compound, and perform method 200 again for the additional compound. Multiple iterations of the method 200 may be performed to enable detection of NCCs across a large quantity of compounds.

Referring again to FIG. 1, the application system(s) 150 may utilize the scores and/or labels assigned by the NCC scoring engine 140 in the group of NCCs 103 and/or other database to adapt performance of one or more computer-based actions performed by the application system(s) 150. For example, and as described above, the application system(s) 150 may include a search engine, the search engine may receive a search query that includes a compound, and the search engine may treat the compound as a cohesive unit based on determining the compound belongs to the group of NCCs 103 (e.g., it is assigned an "NCC" label and/or a score indicative of an NCC). For example, the search engine may treat the compound as a cohesive unit in identifying and/or ranking one or more web pages and/or other electronic resources that are responsive to the search query and/or in identifying one or more search query suggestions to provide as "suggested searches" as alternatives to the search query.

As another example, the application system(s) 150 may include an indexing engine that indexes webpages and/or other electronic resources based on content of those resources. For example, the indexing engine may be associated with a search engine and may index various resources during "crawling" and/or other analysis of those various resources. For instance, the indexing engine may identify a compound in a resource that is indicated as an NCC and, as a result of being indicated as an NCC, may index the resource based on the compound as a cohesive unit (e.g., in lieu of indexing the resource based on individual words of the compound). Also, for instance, the indexing engine may additionally and/or alternatively identify (and optionally index the resource by) one or more "higher level" annotations based on content of the resource, and may treat the compound as a cohesive unit in generating one or more of the annotations. For example, if the resource contains the compound "soap opera" the indexing engine may assign a part of speech of "noun" to the compound "soap opera", instead of individual parts of speech to "soap" and "opera", based on the compound "soap opera" being indicated as an NCC. Also, for example, the indexing engine may assign an entity identifier to "soap opera" without assigning a separate entity identified to "soap" and "opera".

As yet another example, the application system(s) may include a machine translation engine. The machine translation engine may receive a compound to be translated, and the machine translation engine may treat the compound as a cohesive unit based on determining the compound belongs to the group of NCCs 103 (e.g., it is assigned an "NCC" label and/or a score indicative of an NCC). For example, the machine translation engine may treat the compound "soap opera" as a cohesive unit and translate that compound "as a whole" (i.e., in lieu of translating "soap" and "opera" individually).

Figure 3:
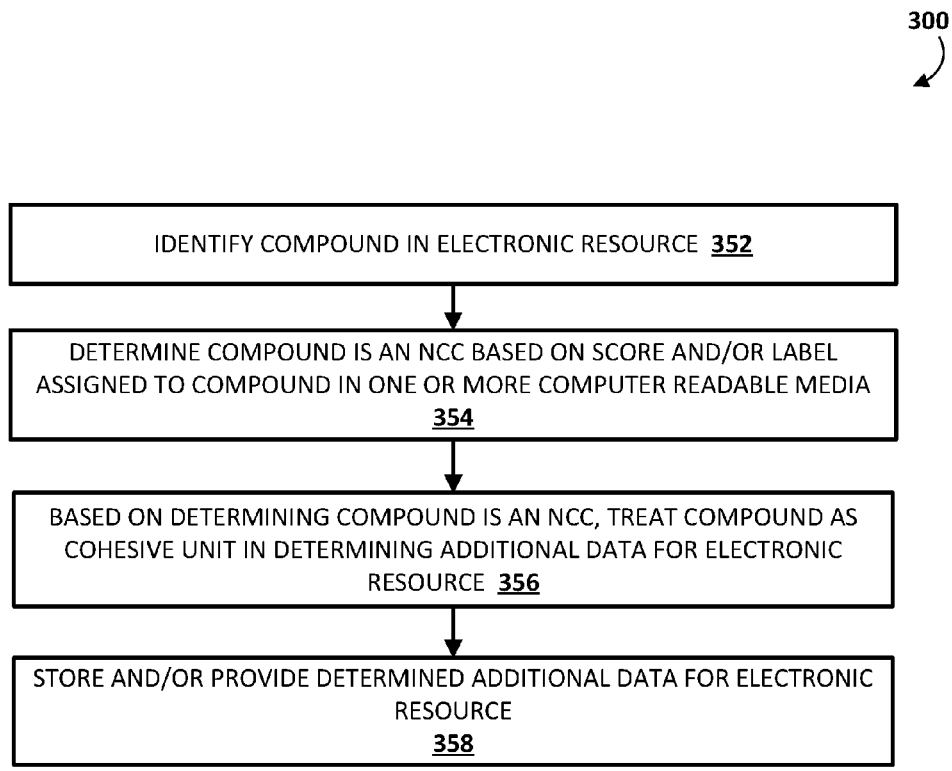
FIG. 3 is a flowchart illustrating an example method of determining a compound in an electronic resource is an NCC, and treating the compound as a cohesive unit based on determining the compound is an NCC.

With reference to FIG. 3, a flowchart is provided that illustrates an example method 300 of determining a compound in an electronic resource is an NCC, and treating the compound as a cohesive unit based on determining the compound is an NCC. For convenience, the operations of the flow chart are described with reference to a system that performs the operations. This system may include one or more components, such as one or more processors (e.g., CPU, GPU, and/or TPU) of one or more of the application systems 150. While operations of method 300 are shown in a particular order, this is not meant to be limiting. One or more operations may be reordered, omitted or added.

At block 352, the system identifies a compound in an electronic resource. The electronic resource may be, for example, a search query submitted by a client computing device, a web page or other Internet accessible document, etc.

At block 354, the system determines the compound is an NCC based on a score and/or a label assigned to the compound in one or more computer readable media. For example, the system may determine the compound is an NCC based on a score and/or a label assigned to the compound based on the method 200 of FIGS. 2A and 2B and/or based on the method 400 of FIG. 4.

At block 356, based on determining the compound is an NCC, the system treats the compound as a cohesive unit in determining additional data for the electronic resource. For example, in determining the additional data, the system may treat the compound as a cohesive unit in lieu of treating the individual words of the compound as individual units. For instance, when the resource is a search query, the system may treat the compound as a cohesive unit in identifying additional data of: one or more web pages and/or other electronic resources that are responsive to the search query and/or one or more search query suggestions to provide as "suggested searches" as alternatives to the search query. Also, for instance, when the resource is an electronic document, the system may treat the compound as a cohesive unit in determining additional data by which to index the resource (e.g., indexing the resource based on the compound and/or based on one or more "higher level" annotations determined based on the compound).

At block 358, the system stores and/or provides the determined additional data for the electronic resource. For example, where the electronic resource is a search query, the system may transmit the additional data to the client device for presentation to the user, via the client device, in response to the search query.

Referring again to FIG. 1, in some implementations the group of NCCs 103 may additionally and/or alternatively be provided to a training example engine 160. For example, all of the compounds labeled by the NCC scoring engine 140 as compositional and/or having at least a threshold NCC score may be provided to the training example engine 160. The training example engine 160 may provide one or more (e.g., all) of the compounds of the group of NCCs 103 to computing devices 106 of one or more human reviewers. The human reviewers may label those compounds using user interface input devices of the computing devices 106, where each of the labels indicate whether the corresponding compound is an NCC. For example, the labels may be binary (e.g., NCC or compositional) and/or may be non-binary (e.g., NCC, most likely NCC, not sure, most likely compositional, compositional).

The training example engine 160 may utilize the labels to generate training examples, that each include training example input of: a corresponding compound and/or feature (s) of the compound; and training example output that is based on label(s) for the corresponding compound and that indicates whether the corresponding compound is an NCC. For example, the training example input of each training example may include: the corresponding compound; observed and/or estimated embedding vectors of the corresponding compound; embedding vectors of the words of the compound; corpus measure(s) for the corresponding compound; lexical measures(s) for the corresponding compound; and/or other feature(s) of the corresponding compound. Also, for example, the training example output of each training example may be binary (e.g., NCC or compositional) and/or may be non-binary (e.g., NCC, most likely NCC, not sure, most likely compositional, compositional). When the training example output is non-binary it may be based on multiple received human labels for the corresponding compound. For instance, if three binary "NCC" labels and one binary "compositional" label for a given compound are received, the training example output for a training example based on the given compound may be "0.75", indicating it is 75% likely to be an NCC. Also, for instance, if two non-binary "NCC' labels and two non-binary "most likely NCC" labels for a given compound are received, the training example output for a training example based on the given compound may be "0.875", indicating it is 87.5% likely to be an NCC.

The training engine 165 may use the training examples to train an NCC neural network model 170 to enable prediction, over the NCC neural network model 170, of whether a compound is an NCC. The NCC neural network model 170 may have an input layer with a shape that conforms to the training example input of the training examples and an output layer with a shape that conforms to the training example output of the training examples. In some implementations of training the NCC neural network model 170, the training engine 165 may: apply, as input to the NCC neural network model 170, training example input(s) from the training examples; generate output over the current version of the NCC neural network model 170 based on the input; and backpropagate error over the NCC neural network model 170 based on the generated output and corresponding training example output(s) from the training examples (e.g., based on a gradient determined based on comparing the generated output to the training example output(s)).

Figure 4:
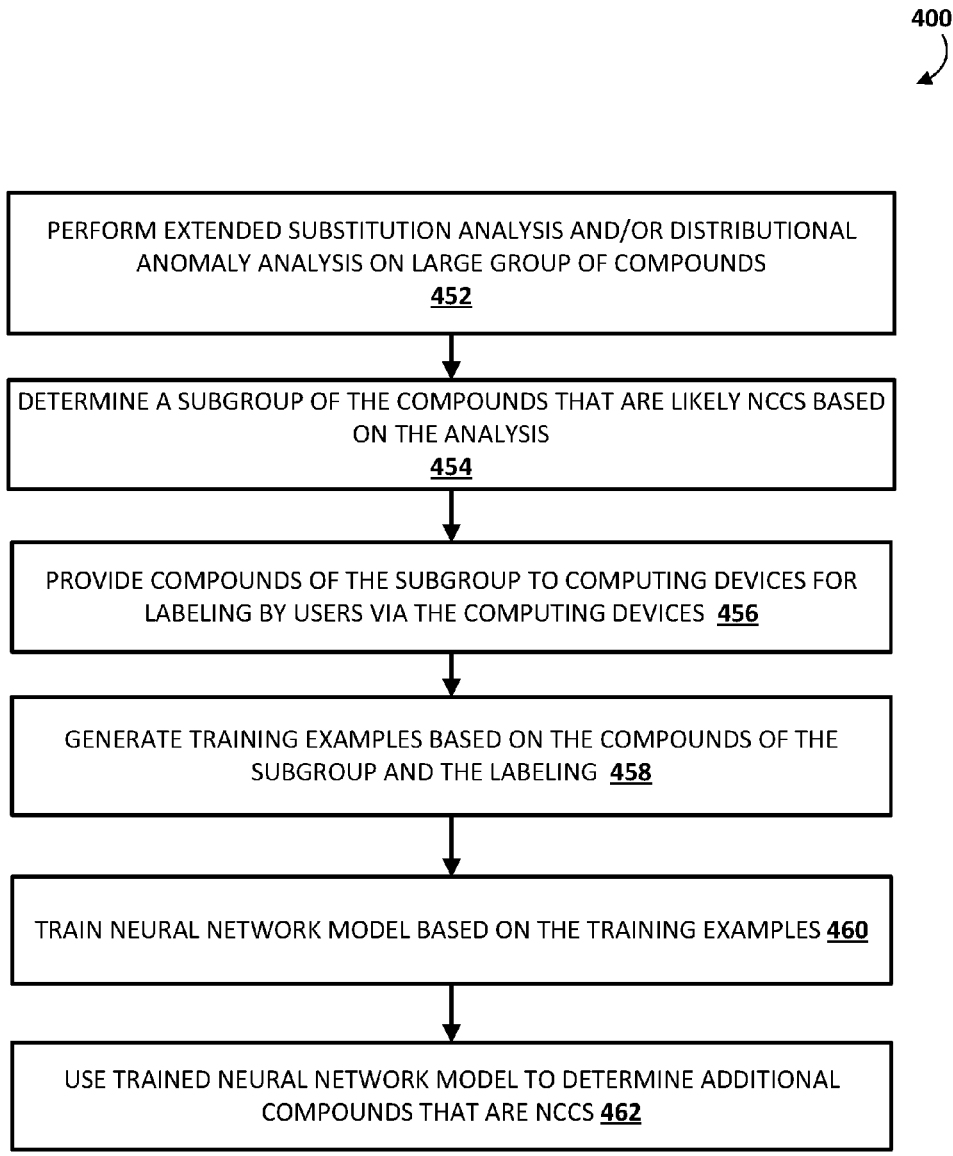
FIG. 4 is a flowchart illustrating an example method of training a neural network model that can be used to determine whether compounds are NCCs.

With reference to FIG. 4, a flowchart is provided that illustrates an example method 400 of training a neural network model that can be used to determine whether compounds are NCCs. For convenience, the operations of the flow chart are described with reference to a system that performs the operations. This system may include one or more components, such as one or more processors (e.g., CPU, GPU, and/or TPU) of the training example engine 160 and/or the training engine 165. While operations of method 400 are shown in a particular order, this is not meant to be limiting. One or more operations may be reordered, omitted or added.

At block 452, the system performs an extended substitution analysis and/or a distributional anomaly analysis on a large group of compounds. For example, the system may perform both an extended substitution analysis and a distributional anomaly analysis based on multiple iterations of the method 200 of FIGS. 2A and 2B.

At block 454, the system determines a subgroup of the compounds that are likely NCCs based on the analysis of block 452. For example, the system may determine the subgroup of the compounds based on the compounds being assigned "NCC" labels and/or having "NCC scores" that satisfy a threshold based on the analysis/analyses of block 452.

At block 456, the system provides compounds of the subgroup of block 454 to computing devices for labeling by users via the computing devices.

At block 458, the system generates training examples based on the compounds of the subgroup and the labeling of block 456.

At block 460, the system trains a neural network model based on the training examples generated at block 458.

At block 462, the system uses the trained neural network model to determine additional compounds that are NCCs.

Figure 5:
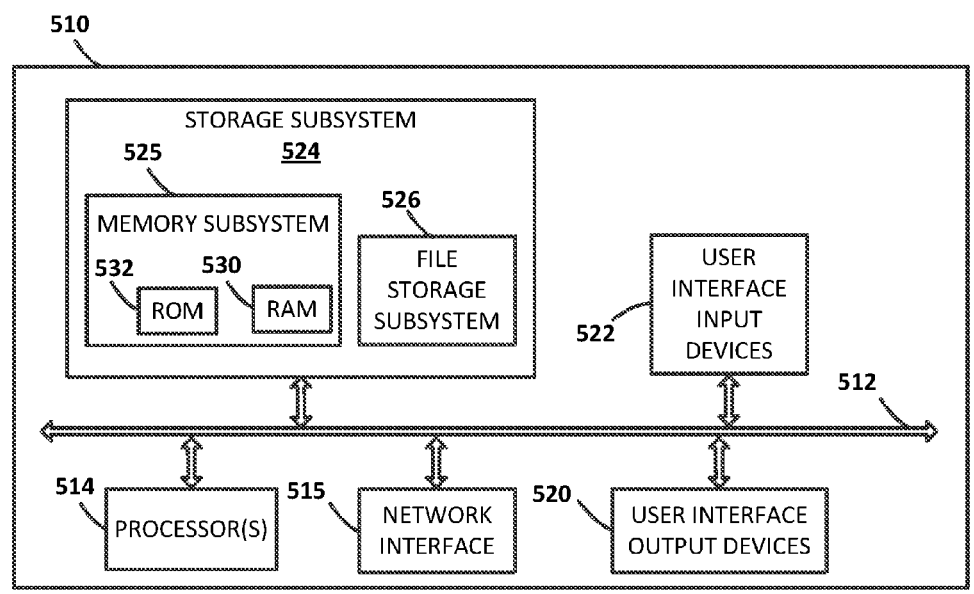
FIG. 5 illustrates an example architecture of a computing device.

FIG. 5 is a block diagram of an example computing device 510 that may optionally be utilized to perform one or more aspects of techniques described herein. In some implementations, one or more of extended substitution system 130, distributional anomaly system 130, se 160, training engine 165, and/or other component(s) may be implemented by one or more components of the example computing device 510.

Computing device 510 includes at least one processor 514 (e.g., a CPU, GPU, and/or TPU) which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 515. The input and output devices allow user interaction with computing device 510. Network interface subsystem 515 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIGS. 2A and 2B, the method of FIG. 3, and/or the method of FIG. 4.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    identifying, from one or more computer readable media, a compound that comprises at least a first word and a second word;
    for each of a plurality of candidate substitutions for the first word:
        determining a plurality of measures that each indicate plausibility of substitution of the candidate substitution for the first word, and
        generating a score for the candidate substitution based on the plurality of measures;
    generating an extended substitution score for the compound based on the scores for the candidate substitutions;
    generating a distributional anomaly score for the compound, generating the distributional anomaly score comprising:
        generating an estimated embedding vector for the compound based on a generated first word embedding vector of the first word and a generated second word embedding vector of the second word,
        generating an observed embedding vector for the compound based on application of the compound to a trained embedding model, and
        generating the distributional anomaly score based on comparison of the estimated embedding vector and the observed embedding vector;
    generating a non-compositional noun compound (NCC) score for the compound based on both the extended substitution score and the distributional anomaly score;
    storing, in one or more of the computer readable media, an assignment of the NCC score, or a label generated based on the NCC score, to the compound;
    subsequent to the storing:
        receiving a search query that includes the compound and that is submitted via a client computing device;
        determining the compound is an NCC based on the stored NCC score or the stored label;
        in response to determining the compound is an NCC, treating the compound as a cohesive unit in identifying content that is responsive to the search query; and
        in response to the search query, providing the content for presentation via the client computing device.

2. The method of claim 1, wherein determining the plurality of measures comprises:
    determining a lexical similarity measure of the measures based on determining a lexical similarity between the candidate substitution and the first word in one or more lexical databases.

3. The method of claim 2, wherein determining the plurality of measures further comprises:
    determining a corpus occurrence measure of the measures that is based on comparison of:
        a first indicated quantity of occurrences of the compound in a corpus, and
        a second indicated quantity of occurrences of an alternate compound in the corpus, the alternate compound being the candidate substitution with the second word.

4. The method of claim 3, wherein determining the plurality of measures further comprises:
    determining a distributional embedding measure of the measures that is based on comparison of the generated first word embedding vector to a generated candidate substitution embedding vector for the candidate substitution.

5. The method of claim 4, further comprising:
    generating the first word embedding vector based on application of the first word to the trained embedding model; and
    generating the candidate substitution embedding vector based on application of the candidate substitution to the trained embedding model.

6. The method of claim 5, wherein the trained embedding model is a trained neural network model and wherein generating the first word embedding vector comprises:
    applying the first word as input to the trained neural network model; and
    generating, over the trained neural network based on the input, the first word embedding vector.

7. The method of claim 3, wherein determining the plurality of measures further comprises:
    determining a distributional embedding measure of the measures that is based on comparison of:
        the observed embedding vector for the compound; and
        a generated alternate compound embedding vector of the alternate compound, the alternate compound being the candidate substitution with the second word.

8. The method of claim 1, wherein generating the NCC score for the compound comprises weighting the extended substitution score more heavily than the distributional anomaly score in generating the NCC score.

9. The method of claim 1, wherein the storing comprises storing the assignment of the label to the NCC score based on the NCC score satisfying a threshold, wherein the label indicates the compound is an NCC.

10. The method of claim 1, wherein treating the compound as the cohesive unit in identifying content that is responsive to the search query comprises:
    determining one or more search results to include in the content based on search result documents, that correspond to the search results, being indexed by the compound as the cohesive unit.

11. The method of claim 1, wherein treating the compound as the cohesive unit in identifying content that is responsive to the search query comprises:
    determining one or more search query suggestions to include in the content based on the search query suggestions including the compound as the cohesive unit.

12. A method implemented by one or more processors, comprising:
    identifying, from one or more computer readable media, a compound that comprises at least a first word and a second word;
    for each of a plurality of candidate substitutions for the first word:
        determining a plurality of measures that each indicate plausibility of substitution of the candidate substitution for the first word, and
        generating a score for the candidate substitution based on the plurality of measures;
    generating an extended substitution score for the compound based on the scores for the candidate substitutions;
    generating a distributional anomaly score for the compound, generating the distributional anomaly score comprising:

generating an estimated embedding vector for the compound based on a generated first word embedding vector of the first word and a generated second word embedding vector of the second word, generating an observed embedding vector for the compound based on application of the compound to a trained embedding model, and generating the distributional anomaly score based on comparison of the estimated embedding vector and the observed embedding vector;

generating a non-compositional noun compound (NCC) score for the compound based on both the extended substitution score and the distributional anomaly score;

determining that the NCC score satisfies a threshold; and in response to determining that the NCC score satisfies the threshold, assigning, to the compound in one or more of the computer readable media, a label that indicates the compound is an NCC.

13. The method of claim 12, wherein determining the plurality of measures comprises:

determining a lexical similarity measure of the measures based on determining a lexical similarity between the candidate substitution and the first word in one or more lexical databases.

14. The method of claim 12, wherein determining the plurality of measures comprises:

generating a corpus occurrence measure of the measures that is based on comparison of:

a first indicated quantity of occurrences of the compound in a corpus, and a second indicated quantity of occurrences of an alternate compound in the corpus, the alternate compound being the candidate substitution with the second word.

15. The method of claim 12, wherein determining the plurality of measures comprises:

determining a distributional embedding measure of the measures that is based on comparison of the generated first word embedding vector to a generated candidate substitution embedding vector for the generate candidate substitution.

16. The method of claim 15, further comprising:

generating the first word embedding vector based on application of the first word to the trained embedding model; and generating the candidate substitution embedding vector based on application of the candidate substitution to the trained embedding model.

17. The method of claim 12, wherein generating the NCC score for the compound comprises weighting the extended substitution score more heavily than the distributional anomaly score in generating the NCC score.

18. The method of claim 12, wherein the storing comprises storing the assignment of the label to the NCC score based on the NCC score satisfying a threshold, wherein the label indicates the compound is an NCC.

19. A method implemented by one or more processors, comprising:

identifying, from one or more computer readable media, a group of compounds that each comprise at least a first word and a second word;

for each of the compounds of the group:

generating an extended substitution score for the compound based on individual scores for a plurality of candidate substitutions of the first word of the compounds;

selecting a subgroup of the compounds based on the extended substitution scores for the compounds;

transmitting the compounds of the subgroup to client computing devices;

receiving, in response to the transmitting, labels for the compounds, the labels generated based on user interface input generated via the computing devices;

generating training examples based on the compounds of the subgroup and the labels, each of the training examples comprising:

training example input based on a corresponding one of the compounds, and training example output based on one or more of the labels for the corresponding one of the compounds; and training a neural network model based on the training examples.

20. The method of claim 19, further comprising:

subsequent to the training, applying, as input to the neural network model, a new compound;

generating, over the neural network model based on the input, output that indicates whether the new compound is an NCC; and assigning, to the new compound in one or more of the computer readable media, the output or a label that is based on the output.

* * * * *